United States Patent
Crome et al.

(10) Patent No.: US 6,352,624 B1
(45) Date of Patent: Mar. 5, 2002

(54) ELECTROCHEMICAL OXYGEN GENERATING SYSTEM

(75) Inventors: Victor P. Crome, Davenport; Russell F. Hart, Blue Grass; Scott R. Sehlin, Bettendorf; Vincent L. Sprenkle, Davenport, all of IA (US); Mike E. Friestad, Rock Island, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/573,891

(22) Filed: May 19, 2000

Related U.S. Application Data (60) Provisional application No. 60/137,219, filed on Jun. 1, 1999.

(51) Int. Cl.⁷ ............................................. C25B 9/00
(52) U.S. Cl. ..................... 204/277; 204/278; 429/30; 429/34
(58) Field of Search ................... 204/242, 277, 204/278, 275; 439/30, 34

(56) References Cited

U.S. PATENT DOCUMENTS

| | | | |
|---|---|---|---|
| 4,713,152 A | * 12/1987 | Walsh | 204/130 |
| 5,186,793 A | 2/1993 | Michaels | 204/59 R |
| 5,205,990 A | * 4/1993 | Lawless | 422/121 |
| 5,332,483 A | 7/1994 | Gordon | 204/265 |
| 5,441,610 A | 8/1995 | Renlund et al. | 204/129 |
| 5,871,624 A | 2/1999 | Crome | 204/286 |
| 5,985,113 A | 11/1999 | Crome et al. | 204/286 |
| 6,033,457 A | * 3/2000 | Lawless | 95/4 |
| 6,194,335 B1 | 2/2001 | Crome et al. | 501/103 |

FOREIGN PATENT DOCUMENTS

WO    WO 99/48595    9/1999

* cited by examiner

Primary Examiner—Kathryn Gorgos
Assistant Examiner—Thomas H. Parsons
(74) Attorney, Agent, or Firm—Lowe, Hauptman, Gilman & Berner, LLP (57) ABSTRACT

This invention relates to devices for separating oxygen from more complex gasses such as air which contains oxygen, and delivering the separated-oxygen at an elevated pressure for use immediately, or for storage and use later. More particularly, the invention relates to solid state electrochemical devices for separating oxygen from more complex gasses to produce the desired oxygen and delivering the oxygen at elevated pressures up to and exceeding 2000 psig.

29 Claims, 10 Drawing Sheets

ELECTROCHEMICAL OXYGEN GENERATING SYSTEM

CROSS-REFERENCES

The present application claims priority to U.S. Provisional Application Ser. No. 60/137,219, filed Jun. 1, 1999, entitled "ELECTROCHEMICAL OXYGEN GENERATING SYSTEM", the disclosure of which is hereby incorporated by reference herein in its entirety.

BACKGROUND OF THE INVENTION

This invention relates to devices for separating oxygen from more complex gasses such as air which contains oxygen, and delivering the separated-oxygen at an elevated pressure for use immediately, or for storage and use later. More particularly, the invention relates to solid state electrochemical devices for separating oxygen from more complex gasses to produce the desired oxygen and delivering the oxygen at elevated pressures up to and exceeding 2000 psig.

DESCRIPTION OF THE RELATED ART

It is well known, and has been demonstrated, that oxygen can be removed from more complex gasses, such as air, by an electrochemical process of ionizing the oxygen molecules, transporting the oxygen ions through a solid electrolyte and reforming the oxygen molecules on an opposite electrolyte surface. An electrical potential is applied to a suitable catalyzing electrode coating applied to the surface of the electrolyte which is porous to oxygen molecules and which acts to disassociate oxygen molecules into oxygen ions at its interface with the electrolyte. The oxygen ions are transported through the electrolyte to the opposite surface, which is also coated with a catalyzing electrode and electrically charged with the opposite electrical potential that removes the excess electrons from the oxygen ions, and oxygen molecules are reformed. However, current oxygen generating systems are unable to deliver high pressure oxygen above 1200 psi. Thus, a need exists in the art for a system and a method which provides a high pressure oxygen. Another need exists in the art for an oxygen generating system which can use contaminated air which is contaminated, for example, with biological agents and/or other toxic substances.

SUMMARY OF THE INVENTION

It is, therefore, an object of the present invention to provide an electrochemical oxygen generating system which can provide high-pressure oxygen.

It is another object of the present invention to provide an electrochemical oxygen generating system which can provide oxygen at pressures up to 2000 psi.

It is another object of the present invention to provide a heat exchange system which can regulate the temperature of oxygen generating modules during oxygen production.

Yet another object of the present invention is to provide a control system for controlling oven chamber temperatures.

Another object of the present invention is to provide a unique mounting and electrical interconnection structure for supporting the oxygen generating modules and provide electrical power thereto.

Another object of the present invention is to provide an oxygen generating system capable of using contaminated air and capable of filtering the contaminated air and providing breathable high purity oxygen gas.

Still another object of the present invention is to provide an oxygen generating system capable of using air contaminated with biological agents and/or other toxic substances and capable of generating breathable high purity oxygen gas.

Still another object of the present invention is to provide a method of sealing a ceramic tube to a ceramic module to allow each to thermally expand and contract without cracking.

These and other objects of the present invention are achieved by an electrochemical oxygen generating system including an oven chamber having a fresh air inlet and a depleted air outlet, at least one ceramic oxygen generating module located in the oven chamber and having an oxygen outlet, a heater mounted in the oven chamber, a heat exchanger positioned between the fresh air inlet and the oven chamber, and a controller for providing electrical power to the at least one ceramic oxygen generating module and for controlling the heater.

The proposed invention is suitable for, but is not limited to, the delivery of high purity oxygen for many medical, semiconductor and industrial applications as well as the filtration of chemical and biological agents in civil and military environments.

Yet another object of the present invention is to provide an electrochemical oxygen generating system capable of utilizing an air supply that contains chemical and/or biological contaminants including an oven chamber having an air inlet from the air supply and a depleted air outlet, at least one ceramic oxygen generating module located in the oven chamber and having an oxygen outlet, a heater mounted in the oven chamber, a heat exchanger positioned between the fresh air inlet and the oven chamber, and a controller for providing electrical power to the at least one ceramic oxygen generating module and for controlling the heater, wherein oxygen gas provided to the oxygen outlet is free of the chemical and/or biological contaminants.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

U.S. Pat. No. 5,985,113 issued on Nov. 16, 1999, U.S. Pat. No. 5,871,624 issued on Feb. 16, 1999 and application Ser. No. 09/148,831 filed Oct. 15, 1999, now U.S. Pat. No. 6,194,335, all of which are incorporated herein in their entirety and assigned to the instant assignee, teach how an electrochemical oxygen generating device can be manufactured that not only generates oxygen, but can be used to deliver the oxygen gas at pressures exceeding 2000 psig. It should be understood that terms such as "left" and "right" as used herein are to be construed in the relative sense and that the present invention is usable in any orientation.

Figure 1:
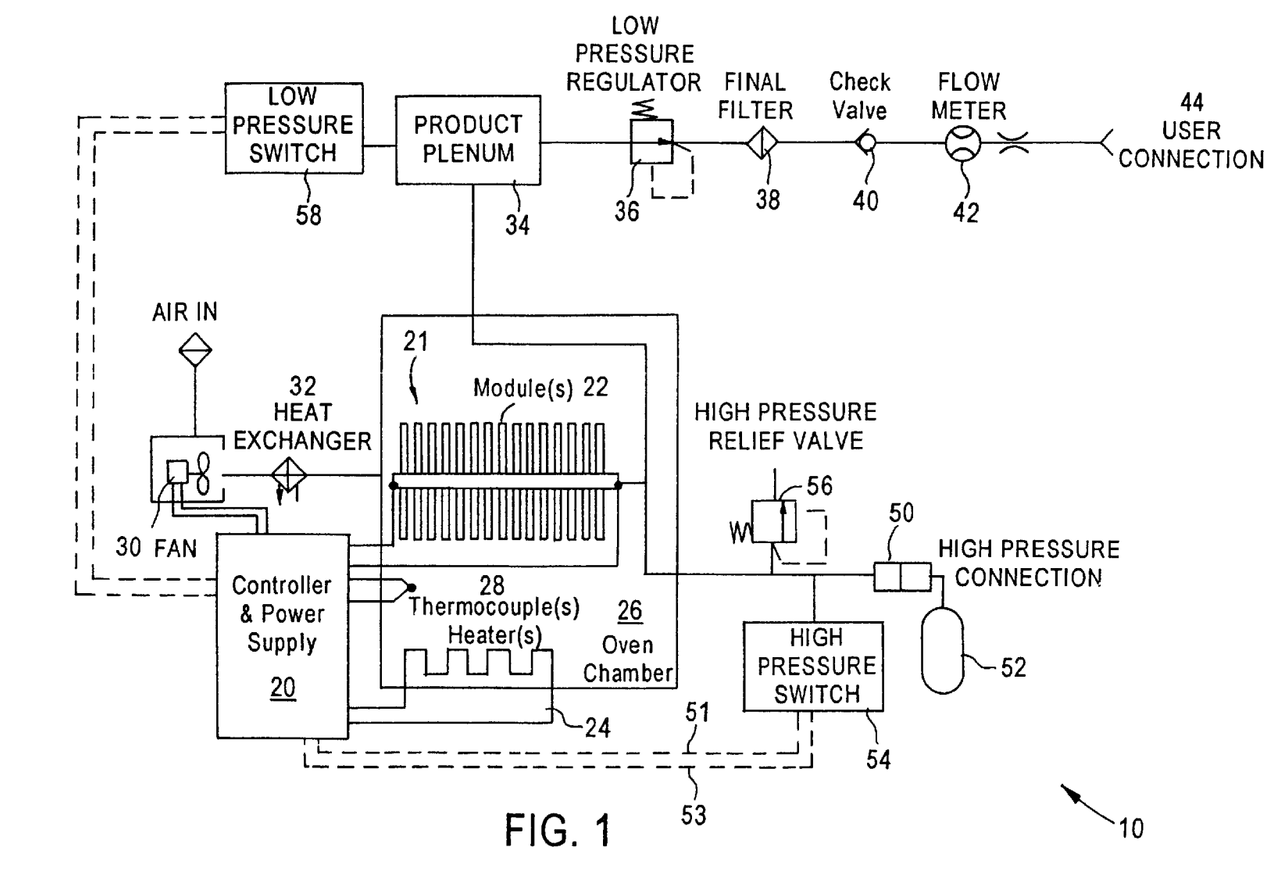
FIG. 1 depicts a schematic of a complete oxygen generating system 10 utilizing an electrochemical-oxygen generator in the form of a modular ceramic oxygen generator.

FIG. 1 illustrates a schematic of a complete oxygen generating system 10 utilizing an electrochemical-oxygen generator in the form of a modular ceramic oxygen generator. This schematic depicts a power supply and controller 20 that supplies electrical power to an oven heater 24 to raise the temperature within the operating range of an oxygen-generating module assembly 22. The oxygen-generating module 22 assembly can include or more oxygen-generating modules such as those disclosed in U.S. Pat. No. 5,871,624 and U.S. Pat. No, 5,985,113.

The temperature range in an oven chamber 26 may be about 500 to 800 degrees Celsius, depending on the materials used to construct the oxygen-generating module assembly 22. The oxygen-generating modules 22 are positioned in the oven chamber 26. After the oven chamber 26 reaches the minimum preferred operating temperature, as detected by at least thermocouple 28 mounted in the oven chamber 26, the controller 20 begins to apply electrical power to a fan motor 30 to deliver oxygen-laden air through a counter-flow heat exchanger 32 into the oven 26 chamber to a module assembly 21 including at least one module 22. The controller 20 also delivers electrical power to the modules 22, and oxygen is electrochemically generated, as taught in U.S. Pat. No. 5,871,624 and U.S. Pat. No. 5,985,113. Depending upon the amount of oxygen to be generated, the amount of electrical power can be varied. As electrical power is delivered to the modules 22 and oxygen is generated, electrical resistance within the modules 22 generates additional heat. To compensate for this additional heat, the controller 20 reduces power to the oven heater 24, to maintain the desired nominal operating temperature in the oven chamber 26. The oxygen being generated is delivered to a product plenum 34, which acts as a temporary oxygen storage vessel. The oxygen is delivered from the product plenum 34 to a low-pressure regulator 36, final filter 38, check valve 40, flow meter 42, and lastly a user-adjustable valve 44 for immediate use, for example, by a patient.

Oxygen may also be delivered to a high-pressure connection that allows connection 50 of a removable portable oxygen storage cylinder 52. The portable cylinder 52 is filled automatically and can be used later. The controller 20 applies appropriate electrical power to the modules 22 to generate oxygen at elevated pressures until a high-pressure switch 54 detects a pressure over about 1800 psig. Upon exceeding 1800 psig, the controller 20 reduces power to the modules 22 until pressure at the high-pressure switch 54 falls below 1800 psig. The controller 20 also electrically monitors the low-pressure switch 58. This switch 54 enables regulation of the pressure delivered to the product plenum 34 and high-pressure connector 50 to a nominal pressure of about 1800 psig. The switch 54 is electrically connected to the controller and power supply 20 by lines 51, 53. A high-pressure relief valve 56 vents excess pressure above about 2000 psig, in the event of a malfunction of the controller 20 to limit the nominal pressure to less than 2000 psig, and to relieve excessive temperature-related pressure increases. It should be understood that the maximum normal operating pressure is approximately 1800 psig. The controller 20 also electrically monitors the high-pressure switch 54. If the operating pressure is below the minimum operating pressure after a given period of time, then the controller 20 activates a warning light and audible alarm (not shown).

Figure 2:
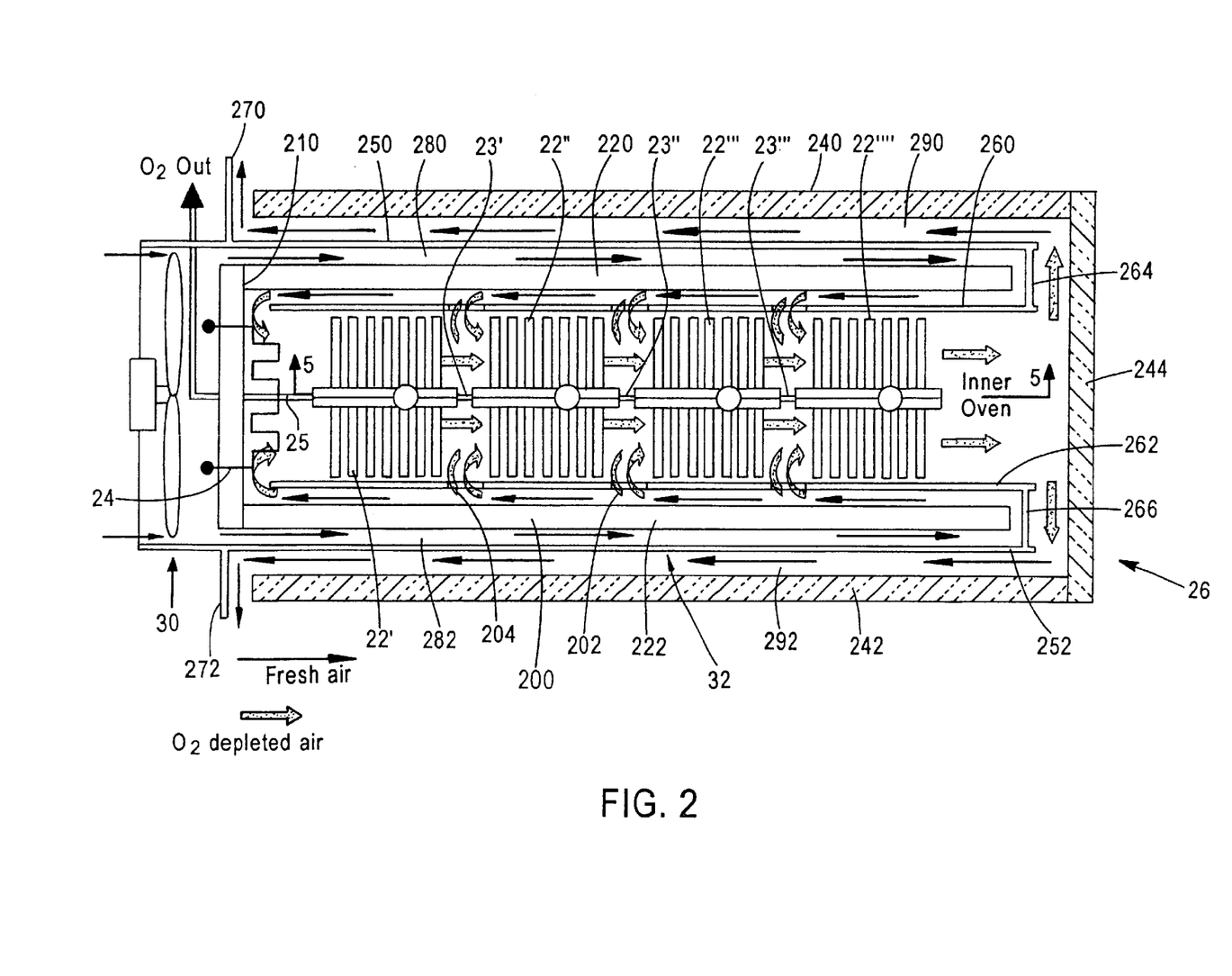
FIG. 2 is a schematic diagram depicting a cross-section of the ceramic oxygen generating system depicting the oven, insulation, modules, heaters, planar counter-flow heat exchanges, air-flow dampers and fan.

FIG. 2 illustrates a cross-section of the ceramic oxygen generating system depicting the oven 26, insulation 200, oxygen-generating module assemblies 22, heaters 24, planar counter-flow heat exchangers 32, air-flow dampers 202, and fan 30. The counter-flow heat exchanger is a very effective, simple, low-cost design approach. As depicted in FIG. 2, four oxygen generating modules 22', 22"22'", 22"" form the oxygen-generating assembly 21 although any number of modules can be used. The oxygen-generating modules 22', 22", 22'", 22"" are manifolded together by tubes 23', 23", 23'". An outlet tube 25 passes through the wall 210 to provide high pressure oxygen to the product plenum 34 and the high pressure connection 50.

Cool fresh air is heated before the air enters the inner oven, and the hot air is cooled before it exits the oven 26; thereby, conserving energy. In a planar counter-flow configuration illustrated in FIG. 2, the fan 30 introduces cool, oxygen-laden air into the channels 280, 282 between the outer surface of the inner walls 220, 222 made of oven insulation 200 and the inner surfaces 250, 252 of the heat exchanger wall. This cool air is heated as it passes inward along the heat exchanger wall, because hot oxygen-depleted air is exiting outward from the inner oven 26 on the other side of the heat exchanger wall. The incoming air is also partially heated by an outer surface of the walls 220, 222 of oven insulation 200, followed by an inner surface of the walls 220, 222 of the oven insulation 200, after a 180° turn mid-way into the inner oven. Channels 280, 282 each flow from the fan 30 from left to right and then reverse and flow from right to left. An outer structure is formed by longitudinal walls 240, 242 radially outwardly spaced from the inner surfaces 250, 252, respectively to form channels 290, 292, respectively. An end cap 244 joins walls 240, 242 at an end of the oven 26. Walls 270, 272 extend radially outwardly from the walls 250, 252 and are located at ends of the channels 290, 292 to redirect exhaust gases in a radial direction. Endcaps 264, 266 connect with walls 250, 260 and 250, 262, respectively.

Electrical resistance is inherent to all electrochemical oxygen generating systems, because these systems generate oxygen with the flow of electrical current. The electrochemical oxygen generating modules 22 generate heat as well as oxygen. Too much oven insulation 200 and very efficient heat exchangers could result in runaway oven temperatures. One method of temperature control is to ensure that some amount of heater activation is always used to maintain the normal operating temperature, after the initial startup period of time. Another method is to adjust the fan 30 speed to cause additional air to be circulated through the oven 26 carrying away the excess heat. The controller 20 monitors the temperature in the inner oven 26 using one or more strategically placed thermocouples 28 (not shown in FIG. 2) to ensure that the oven temperatures are normal. The controller 20 uses this information to adjust either the heater 24 voltage or fan 30 speed to control the temperature of the inner oven 26.

As depicted in FIG. 2, six air dampers 202 are used in the embodiment depicted in FIG. 2. Three dampers are each mounted to walls 260, 262 with the dampers 202 being positioned between modules 22 and opposite each other. The air dampers 202 shown allow some oxygen-laden air to enter the module chamber or inner oven 26 before completing the entire heat exchanger flow-path to the inner oven. If all oxygen-laden air were forced to traverse the entire heat exchanger flow-path, a higher temperature gradient would occur across the series of modules 22 in the oven. The air would be progressively heated as it passes over each module 22. Allowing some air to enter near the latter modules 22''', 22'''' provides a more uniform temperature across the modules 22'–22'''' and prevents modules 22''', 22'''' from possibly over-heating. These dampers 202 are adjustable and can be manually adjusted during the assembly of the system 10 and during an initial start up test process after completion of the manufacturing and assembly process of the system 10. These dampers 202 include damper flaps 204 which are mounted to a suitable cylindrical rod (not shown) that extends through the inner oven insulation and support structure to outside the inner oven 26. The external ends of the damper rods can be rotated and secured in the preferred orientation during the assembly process. Alternately, the dampers could be adjusted automatically by the controller 20, based upon the inner oven 26 temperatures measured by the thermocouples 28. Several types of electromechanical damper actuators are available that could be used.

Figure 3:
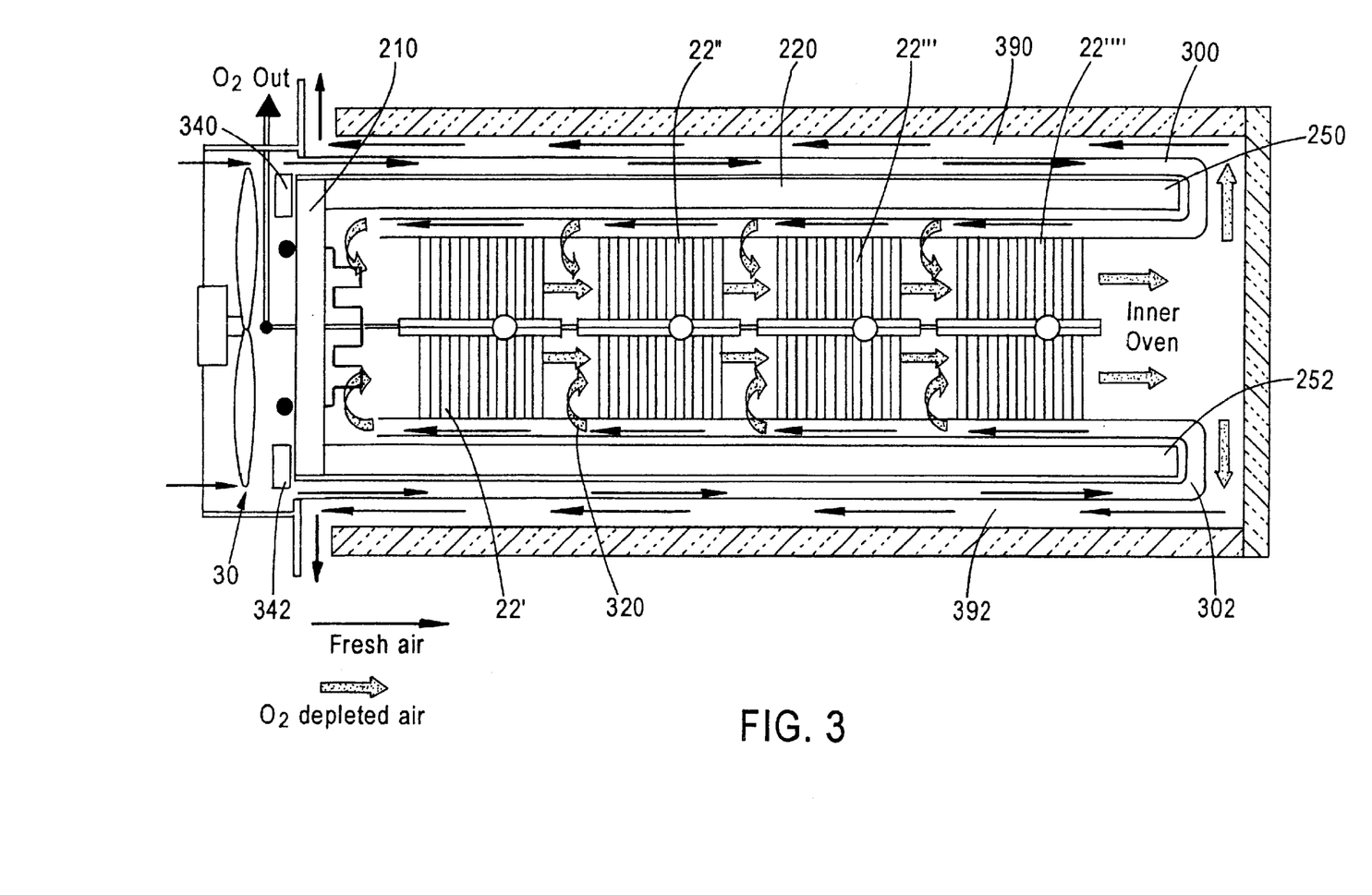
FIG. 3 is another schematic diagram similar to FIG. 2, depicting a second heat exchanger embodiment.

FIG. 3 depicts another type of heat exchanger embodiment. This is another approach comparable to the planar heat exchanger with flow control dampers described above with respect to FIG. 2. A tubular heat exchanger approach utilizes multiple cylindrical tubes 300, 302 that enter the oven between the inner and outer insulation, traverse to the far end of the oven, enter the inner oven 26, and returns to the opposite end of the oven on the inside of the inner insulation. The cool oxygen-laden air is forced into the tubes 300, 302 by the fan 30 and delivered to the inner oven 26 at the same end of the oven. The hot oxygen-depleted air flows in the opposite direction around the outside of the tubes 300, 302 to cool the oxygen-depleted air and warm the cool oxygen-laden air. Some of the tubes have holes 320 at strategic points (typically between modules 22', 22''; 22'', 22'''; and 22''', 22'''') along the return path in the inner oven, or some of the tubes end at strategic points along the return path in the inner oven 26. This allows some air to enter the chamber prior to traversing the complete length of the tubes 300, 302; thereby, allowing a more even temperature gradient as described above for the planar heat exchanger with air flow-control dampers. Channels 390, 392 correspond to channels 90, 92 discussed above with respect to FIG. 2.

As depicted in FIG. 3, dampers 340, 342 are located where the cool oxygen-laden air enter the tubes 300, 302 near the fan 30. Some of the tubes that do not have holes or do not end before traversing the complete pathway into the inner oven 26 at the fan-end also do not have dampers. The remaining tubes, that do have holes or do end before traversing the complete pathway into the inner oven at the fan-end, also do have dampers. The dampers are located at the open end of the appropriate tubes on the fan-side of a tube-plate that secures the tubes in place. The dampers can be positioned across the open-ends of the tubes to occlude them, as required to regulate the temperature of each zone within the inner oven. The dampers 340, 342 can be manually adjusted or automatically adjusted by the controller 20 as described earlier.

Another method for controlling the temperature of the ceramic generator or the rate of oxygen production is to reduce the quantity of feed air supplied to the generator, or to reduce the quantity of oxygen in the feed air. As previously explained, there is an equivalence between the rate of oxygen production and the current flow through the ceramic generator. The electrical current flow is proportional to the voltage applied to the generator minus the Nernst-Einstein voltage. The Nernst-Einstein voltage is proportional to the difference in the oxygen partial pressures at the input and output of the ceramic generator. Therefore, as the input oxygen partial-pressure decreases or as the output oxygen partial pressure increases, or both, the current flow and thus the oxygen flow is decreased. In practice, the input oxygen partial pressure can be reduced by use of the dampers previously described as well as other means such as reducing fan 30 speed. As the oxygen flow and the current flow through the ceramic generator are reduced, the power dissipation in the generator is reduced thereby reducing the self-heating within the module resulting in a lower generator temperature.

Figure 4A:
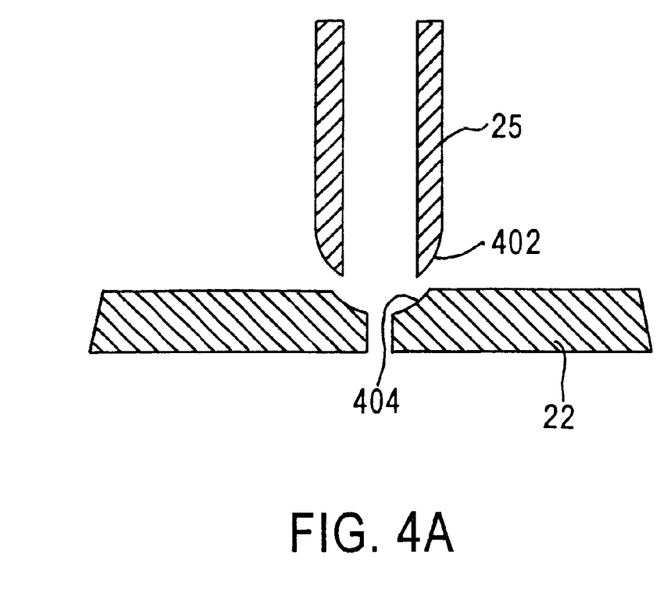
FIGS. 4A and B depict pneumatic interface using a concave depression.
Figure 4B:
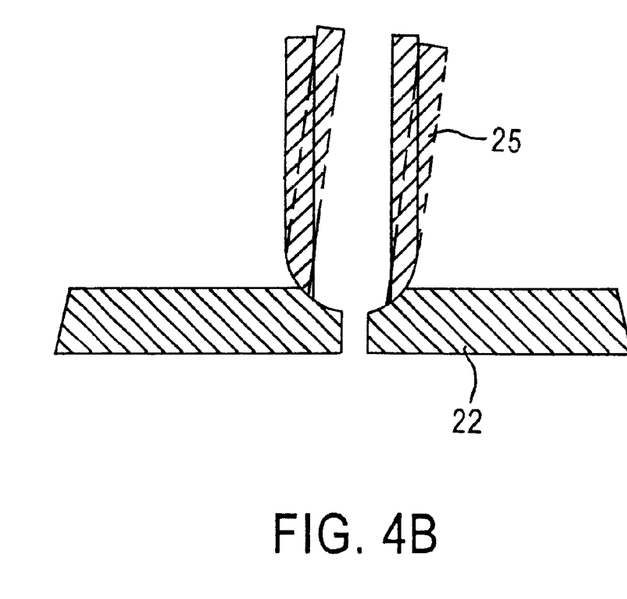

In all of the described embodiments, the oxygen delivery tubes 23', 23'', 23''' and 25 of the individual modules 22 must either extend outside the heated section of the furnace or be internally joined and the resulting tube 25 extended outside the furnace. One method of extending individual tubes outside the furnace or inner oven 26 is to use a ceramic tube 25 sealed into a matched hole in the module 22'. The use of a ceramic tube minimizes stresses on the tube-to-module interface caused by differing coefficients of thermal expansion. However, this method presents a problem in that the tube, module, and seal are all composed of brittle materials that cannot sustain any significant displacement without breaking. It is difficult to prevent the application of bending moments on the tubes using this approach. The preferred method is to form a more resilient seal by forcing a spherically shaped device 402 into a matching concave surface 404. The convex spherical shape can be formed on the outer surface of the tube 25 and the concave surface in the module wall or vice versa. Also, the concave depression could be conical in form as well as spherical. This method allows a seal that will accommodate a significant amount of misalignment if the tube 25 is continuously pressed into the concave surface 404 as, for instance, by the action of a spring or weight. FIG. 4 illustrates this method and shows a significant misalignment accommodated while still maintaining a viable seal.

Another aspect associated with assembling the ceramic modules into a useable oxygen generating system is how the modules 22 are mounted in the furnace 26 and how the electric power is applied to these modules 22. In the present invention, the means of supplying power to individual modules 22 and the means of mounting the modules 22 in the furnace are combined.

Figures 5, 5A:
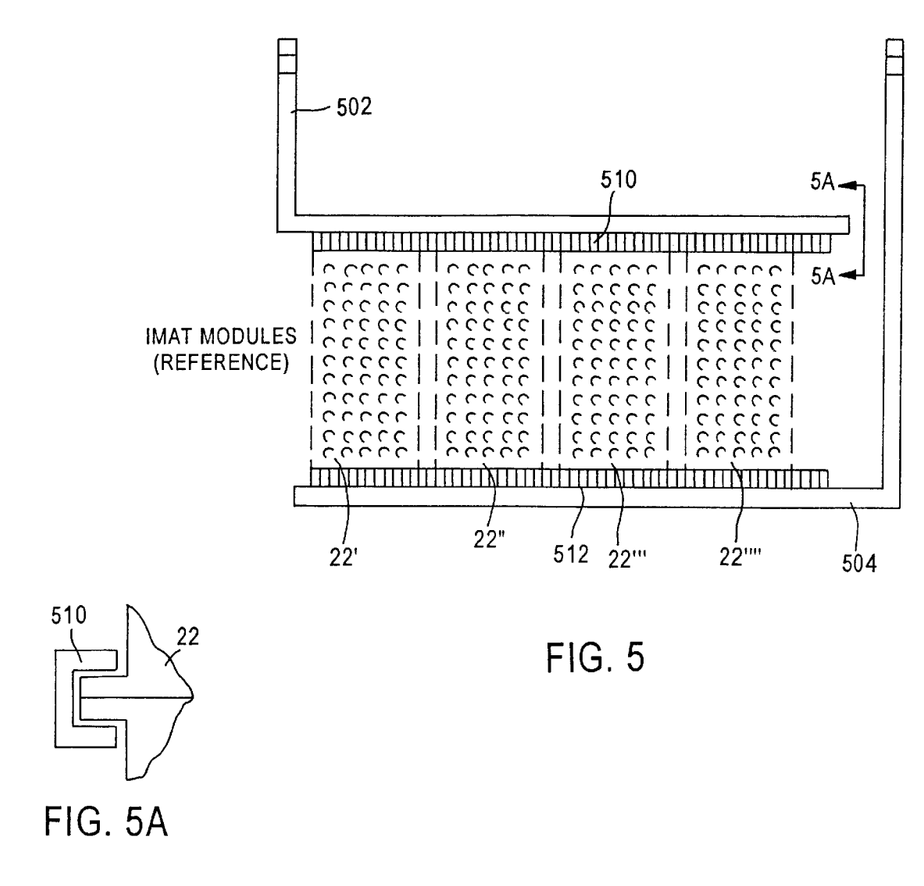
FIG. 5 depicts an arrangement for combining mounting and power provisions taken along lines 5—5 in FIG. 2.
FIG. 5A is a partial cross-sectional view taken along lines 5A—5A in FIG. 5.

FIG. 5 illustrates one method of combining mounting and power provisions. As illustrated, an L-shaped support bar 502 mounted above the modules provides physical support to restrain modules 22', 22", 22''', 22'''' from moving. A second L-shaped support bar 504 is mounted below the modules 22', 22", 22''', 22''''. Clips are formed from a material that retains strength at a high operating temperature such as Inconel and/or Monel. A clip is formed in a "U" shaped cross section of a suitable dimension to clamp tightly around the ends of the modules as depicted in FIG. 5A. A multi-fingered U-clip similar to typical printed circuit board card-edge electrical connectors is preferred. The multi-fingered U-clip can more readily accommodate module 22 thickness variations along the clip's longitudinal axis. The clips 510, 512 are permanently attached to the support bars 502, 504 using a technique such as welding or brazing. Both the clip 510, 512 and support 502, 504 are then coated with a conductive material, such as silver, to minimize electrical and interfacial resistances. Power is provided to the system by applying a positive voltage to the end of one support bar 502, 504 and a negative voltage to the end of the other support bar 502, 504. As depicted in FIG. 5, the modules 22', 22", 22''', 22'''' are provided power in a parallel-powered configuration. That is, the same voltage is applied to all modules 22', 22", 22''', 22''''.

Figure 6:
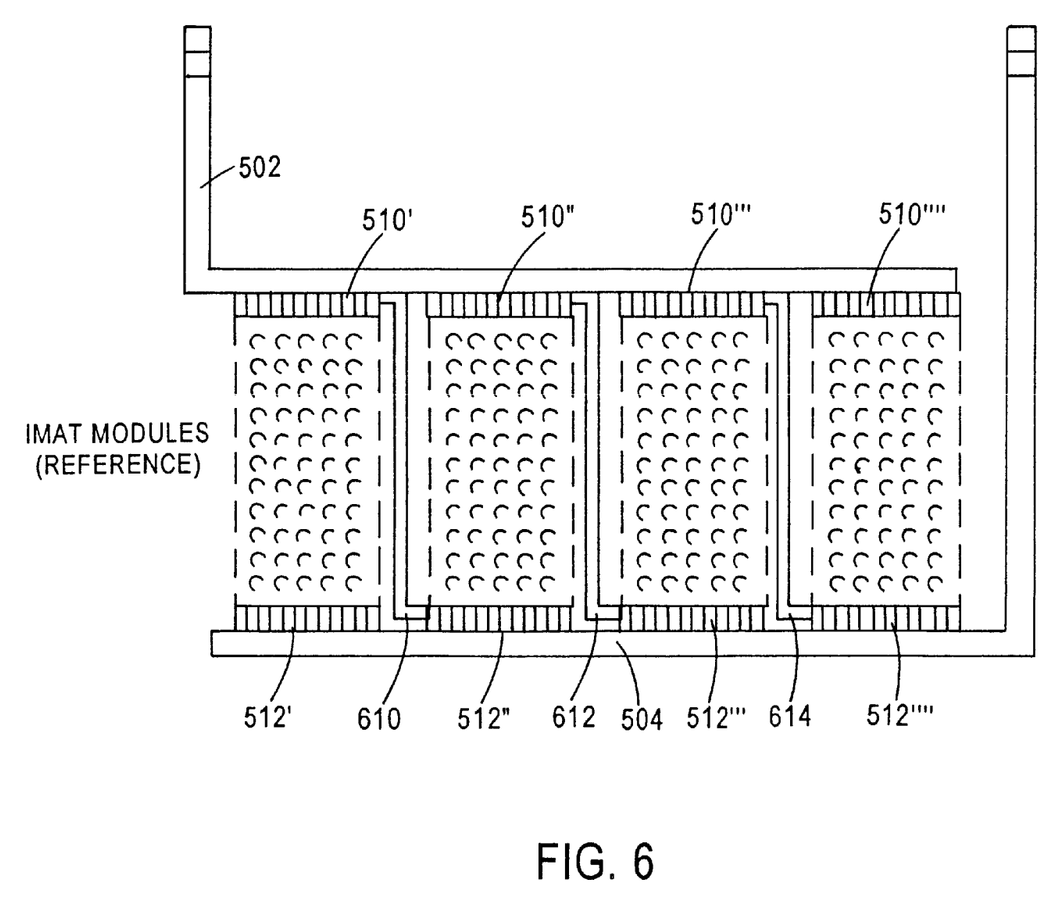
FIG. 6 depicts a mounting arrangement using "Z" clips.
Figure 7:
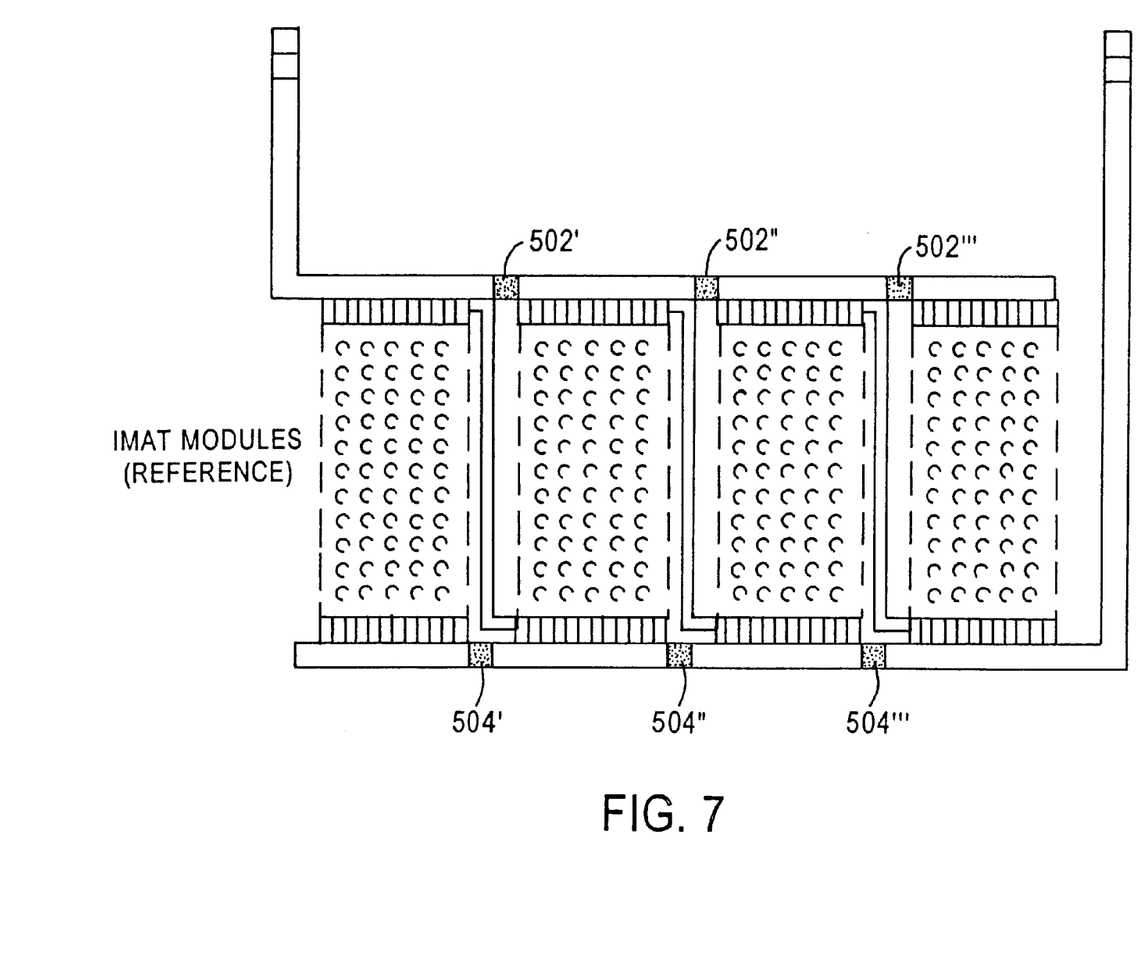
FIG. 7 depicts an alternative "Z" clip arrangement in which the support bar is segmented to provide electrical isolation.

If the surface of the support bar 502, 504 is nonconductive, as a result of a coating, oxidation layer, or bulk material property, then a series-powered configuration is also possible. If the series configuration is desired, the clips are not electrically connected to the support bars. This configuration is illustrated in FIG. 6. In this configuration, "Z" clips 610, 612, 614 are each formed from a single piece of a metal that retains strength at the operating temperature, then coated with a conductive material such as silver. Each clip 610, 612, 614 is attached to the support bar 502 and can be used at each end of the string to supply the positive and negative voltages to the modules 22. In another embodiment, the clips may be electrically connected to the support bars. In this case, the support bars 502, 504 are coated with a conductive coating except in selected shaded regions 502', 502", 502''' and 504', 504", 504''' as illustrated in FIG. 7. Alternatively, the support bar can be segmented to provide electrical isolation in the designated areas shown in black. Also, by rotating every other module 180° the "z-strip" shown in FIG. 7 can be eliminated.

Figures 8A, 8B, 8C, 8D, 8E, 8F:
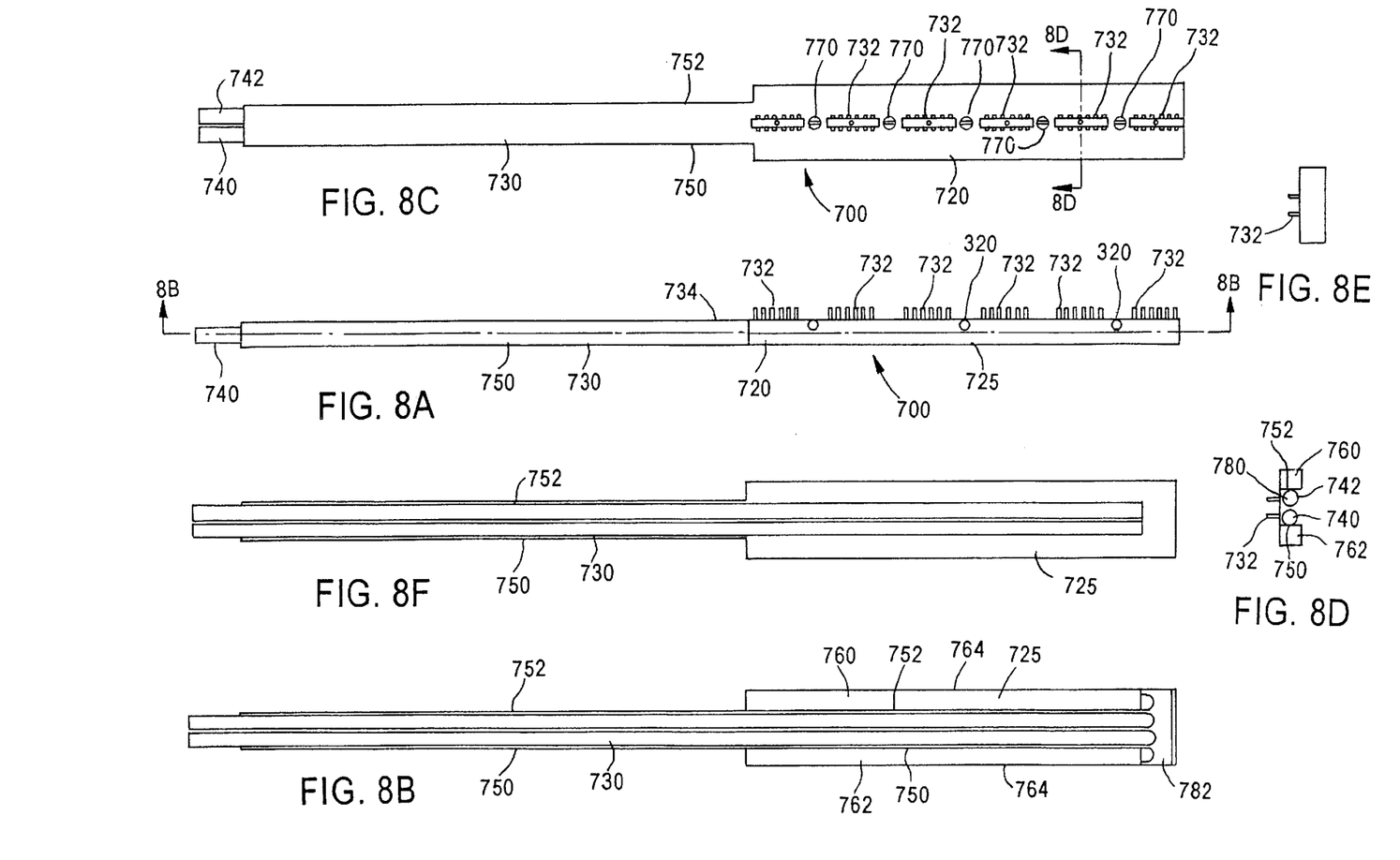
FIG. 8A is a side elevational view of an integrated air distribution manifold and mounting bracket assembly.
FIG. 8B is a cross-sectional view taken through lines 8B—8B in FIG. 8A.
FIG. 8C is a top plan view of the integrated air distribution manifold.
FIG. 8D is an end view of the integrated air distribution manifold.
FIG. 8E is a cross-sectional view taken through lines 8D—8D in FIG. 8C.
FIG. 8F is a bottom plan view of the integrated air distribution manifold.

Referring now to FIGS. 8A–8F, an integrated air distribution manifold and mounting bracket system is depicted. This manifold is primarily usable for the schematic illustrations depicted in FIGS. 2 and 3. As depicted in FIG. 8A, the manifold assembly 700 includes a manifold body 720 having a wide portion 725 which is positioned in the oven chamber 26. Extending outwardly from the oven is an outer portion 730. A plurality of manifold mounting brackets 732, preferably made from inconel are fastened to a top surface 734 of the portion 725. As depicted, there are six manifold clips 732, although it should be understood that any number can be used. Two tubes 740, 742 (see FIG. 8C) are positioned within walls 750, 752. Walls 750, 752 extend the entire length of portion 730 and for the majority of the length portion 725. A gap is formed between tube 740, 742 and walls 750, 752 to provide a passageway. As depicted in FIG. 8, there are outer passageways 760, 762 formed between walls 750, 764 and 752, 764. As depicted in FIG. 8C, there are a plurality of holes worn between mounting brackets 732 in the portion 730. The holes are 770. As depicted in FIG. 8D, the mounting bracket 732 extend inwardly into the oven chamber 726.

It should be noted that two manifold assemblies are used on opposite ends of the ceramic modules 22. The manifolds 700 can either be mounted horizontally or vertically. Ceramic oxygen generating modules 22 are each clipped into a pair of clips 732 as described below.

As depicted in FIG. 8D, a return passageway 780 is formed between walls 750, 752, tubes 740, 742 and the upper surface 734 of manifold body 720.

The wider portion 730 of the assembly 700 where the mounting bracket 732 are attached is inside the oven chamber 26 while the narrower portion 730 of the assembly 700 is outside the oven chamber 26. The manifold assembly operates as follows: cool fresh air flows through tubular elements 740, 742, picking up heat as the cool fresh air flows to the opposite end 782 (see FIG. 8B). At the end of 782, the fresh air makes a turn and flows into the outer distribution passages 760, 762. The hot fresh air then enters the oven chamber 26 through holes 320. Hot oxygen depleted air exits the oven chamber 26 through holes 770 into the volume 780 formed between the tubular elements 740, 742 and the distribution passages 760, 762. The hot depleted air passes over the tubular element 740, 742 giving up heat to the fresh air inside the tubular elements 740, 742 as the hot depleted air flows out of portion 730. Advantageously the manifold assembly has the following functions and features: mechanical supporter of the ceramic modules 22, electrical connection to the ceramic modules 22, fresh air distribution and injection into the oven chamber 26, depleted air extraction from the oven chamber 26, heat exchange between the fresh and depleted air, and cooling of the mounting bracket 732 and manifold assembly 700 due to heat exchange within.

Figures 9, 10:
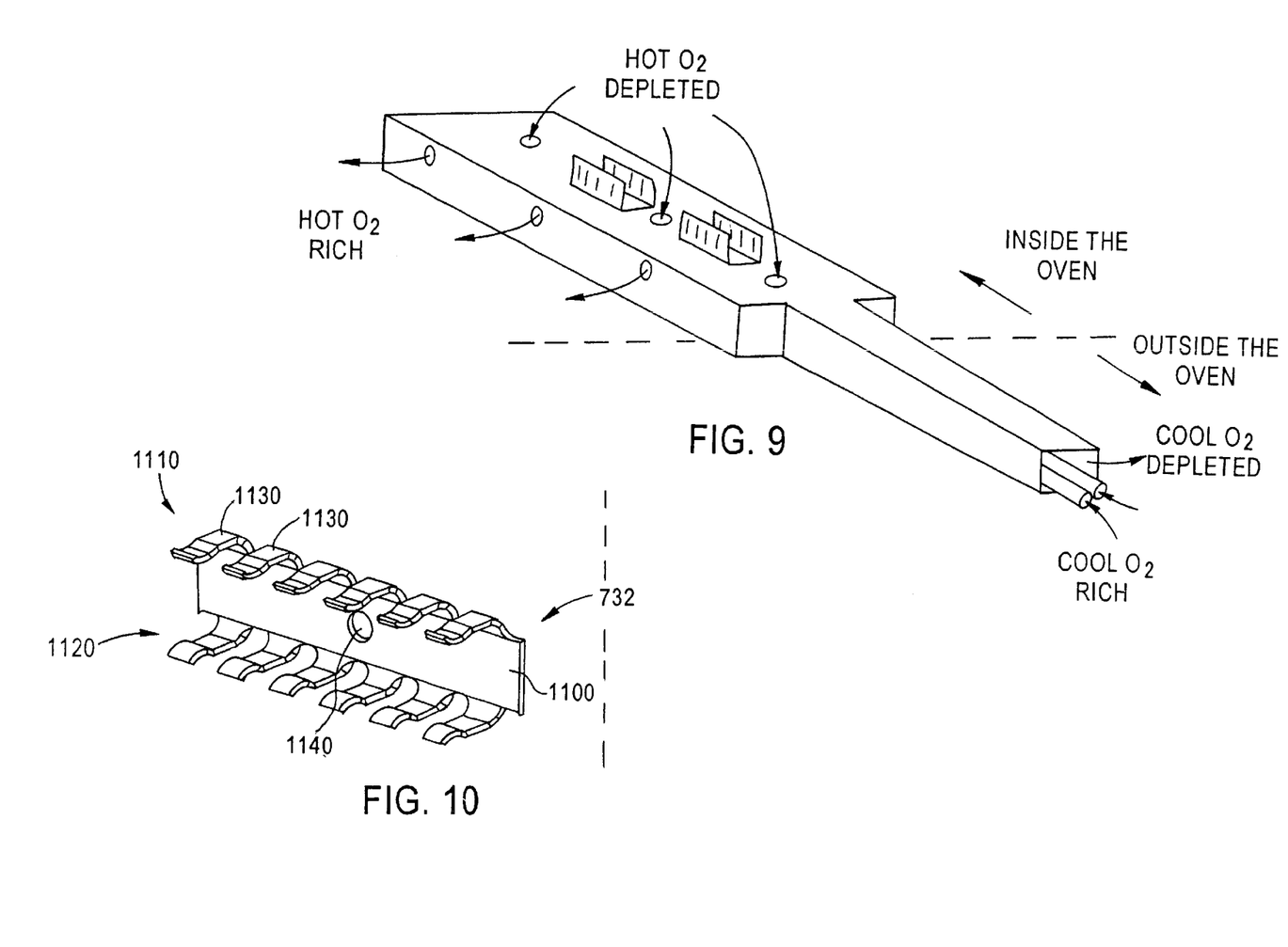
FIG. 9 is a perspective view illustrating the use of the air distribution manifold of FIGS. 8A–8F.
FIG. 10 is a perspective view of the mounting bracket used in the present invention.

The mounting bracket 732 is depicted in FIG. 10 is a sheet metal part that has a flat mounting face 1100 and two rows of spring contacts 1110, 1120. Each of the contacts 1130 provides for secure mounting and electrical connection for each of the ceramic modules 22. Inconel or another high temperature alloyed is preferred as the material for the mounting bracket. A hole 1140 is centrally located in the mounting clip 732.

The assembly 700 will be somewhat cooler than the ceramic modules 22 and oven chamber 26 is a consequence of the heat exchange occurring within. The cooler temperature will provide for longer assembly life and/or less stringent metallic material requirements. The cooler temperature will also help ensure electrical connection integrity because of more stiffness in the mounting bracket 732 material, less degradation of the conductive coating that is applied to the clips 732, and higher electrical conductivity of the metallic materials.

The oxygen generating system described herein can also be used to provide a supply of pure oxygen from an air supply that contains chemical and/or biological contaminants. Because of the nature of the process used to generate oxygen and the temperature at which the system operates, chemical and/or biological contaminant are precluded from passing through the oxygen-generating modules 22 into the product plenum 34. In addition, because of the high operating temperature of the modules 22, the operating temperature is sufficient to kill most or all biological agents and decompose toxic compounds. The foregoing arrangement has many uses including, but not necessarily limited to, providing pure oxygen to processes which operate in a contaminated environment, for example, in chemical plants and pharmaceutical manufacturing operations, and may also be used to provide oxygen for human consumption in environments that have been intentionally contaminated as a result of chemical and/or biological warfare. Furthermore, it is possible to utilize one or more oxygen generators such as those described herein for the purpose of decontaminating air in a building or other environment that has been subject to intentional or unintentional chemical and/or biological contamination, for example, for an accidental biological release in a laboratory environment.

The properties of the solid ceramic electrolyte enable the separation process to occur at a fundamentally higher level of selectivity than is possible using porous filtration methods, such as pressure-swing adsorption (PSA). The solid electrolyte used in forming the ceramic modules 22 is formed as a dense ceramic member (defined as containing no open porosity). The crystal structure of the solid electrolyte contains oxygen ions, in addition to metal cations. Examples of chemical formulas are $ZrO_2$ and $CeO_2$. The base compositions are altered by the substitution of a small percentage (typically 5%–20%) of the metal ions by another metal cation of a slightly different size and electrical charge. The result of the substitution is the creation of oxygen vacancies within the crystal structure of the ceramic material. At elevated temperatures (above 500 degrees C for known ceramic electrolytes) the negatively charged oxygen ions present in the ceramic material are able to move in response an applied electric field. The oxygen ions move toward the positively charged surface by diffusing into crystal lattice sites that contain oxygen vacancies. When the oxygen ions reach the positively charged surface, they recombine to form oxygen gas ($O_2$).

The oxygen ions and the vacancies through which they diffuse in the Electrochemical Oxygen Generating System have a radius on the order of 1 Angstrom ($10^{-10}$ meters). This small size precludes the entry of any biological agent or other toxic compound. Additionally, the crystal structure is adapted specifically to incorporate the size and electronic orbital structure of the oxygen ion. Occupancy of these sites by any ion other than oxygen would require a rearrangement of the crystal structure, which would require an amount of energy much greater than that encountered during the operation of this device. The ceramic electrolyte can be operated between 500 and 1000 degrees Celsius, which is sufficiently high to decompose most or all biological agents and toxic compounds.

Figure 11:
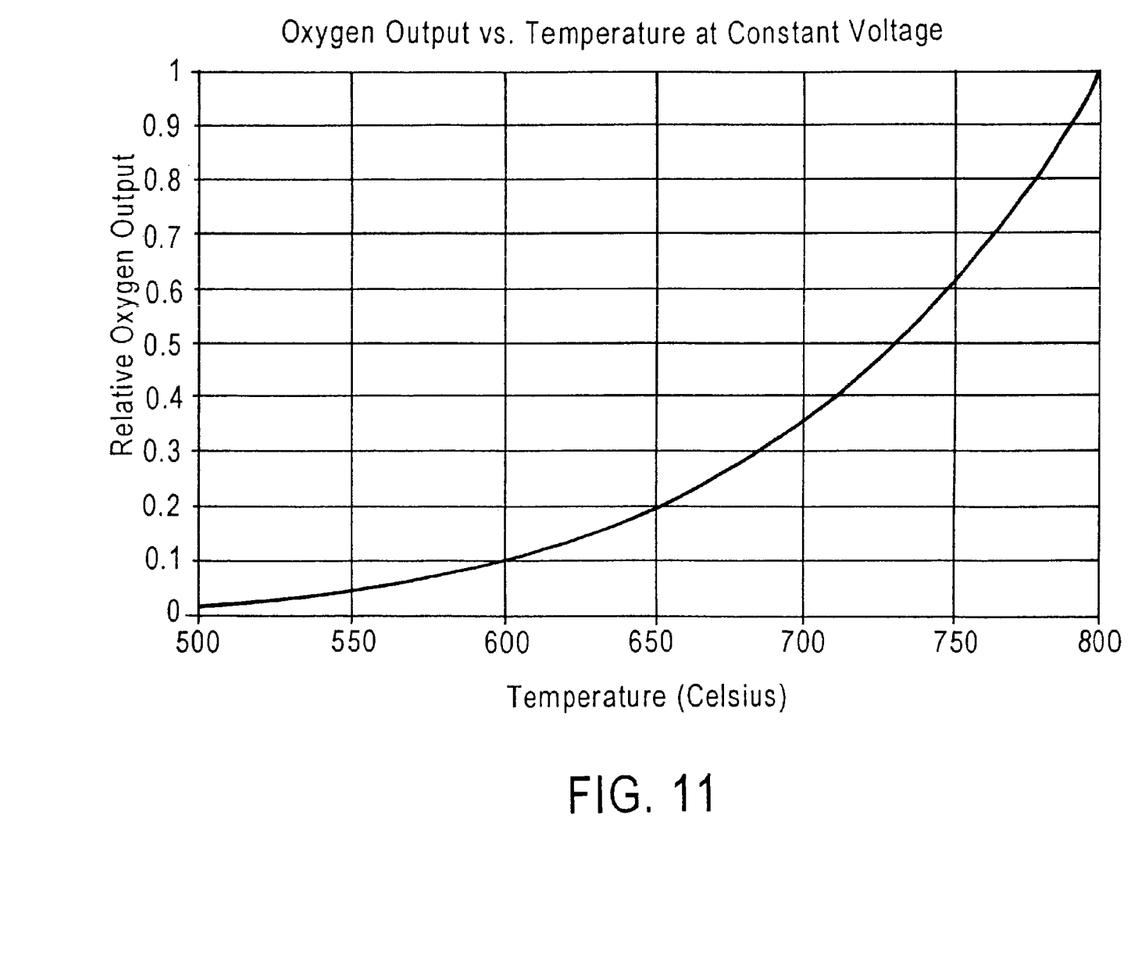
FIG. 11 is a graph illustrating the temperature dependence of oxygen output for the electrochemical oxygen generating system according to the present invention.

The temperature dependence of oxygen output for the Electrochemical Oxygen Generating System is illustrated in FIG. 11. The oxygen output of the oxygen generating system is directly proportional to the electrical current measured across the ceramic modules. When a constant electrical voltage is applied across a module, the amount of current, I, generated is related to the voltage, V, and the electrical resistance, R, of the ceramic electrolyte by the following relationship known as Ohm's Law.

$$I=V/R$$

The electrical resistance of the electrolyte decreases strongly with increasing temperature, resulting in a higher oxygen output when the voltage is held constant and the temperature is increased. The temperature dependence between 500 and 800 degrees Celsius is shown in FIG. 11.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An electrochemical oxygen generating system, comprising:

an oven chamber having a fresh air inlet and a depleted air outlet;

at least one ceramic oxygen generating module located in said oven chamber and having an oxygen outlet;

a heater mounted in said oven chamber;

a heat exchanger positioned between said fresh air inlet and said oven chamber; and a controller for providing electrical power to said at least one ceramic oxygen generating module and for controlling said heater.

2. The electrochemical oxygen generating system of claim 1, further comprising a thermocouple mounted in said oven chamber without being attached to said at least one ceramic oxygen generating module, said thermocouple sending a signal to said controller indicative of a temperature in said oven chamber.

3. The electrochemical oxygen generating system of claim 1, further comprising at least one damper connected to said heat exchanger and controlled by said controller for allowing some of the fresh air to be redirected into said oven chamber and remaining fresh air to flow upstream in said fresh air inlet.

4. The electrochemical oxygen generating system of claim 1, further comprising a fan located between said fresh air inlet and said oven chamber.

5. The electrochemical oxygen generating system of claim 1, comprising a plurality of ceramic oxygen generating modules manifolded together in series.

6. The electrochemical oxygen generating system of claim 5, wherein each said at least one damper is positioned between adjacent ceramic oxygen generating modules and opens from said fresh air inlet into said oven chamber such that some fresh air flows past said damper in said fresh air inlet and the other of said fresh air is redirected into said oven chamber.

7. The electrochemical oxygen generating system of claim 1, wherein said electrochemical oxygen generating system can produce oxygen at said oxygen outlet at pressures up to 2000 psi.

8. The electrochemical oxygen generating system of claim 1, wherein said controller controls fan speed to regulate oven chamber temperature.

9. The electrochemical oxygen generating system of claim 1, wherein said heat exchanger provides a 180° path for fresh air entering said oven chamber and said depleted air has been heated in said oven chamber and is used to preheat said fresh air in said heat exchanger.

10. The electrochemical oxygen generating system of claim 9, further comprising a plurality of tubes each connecting an oxygen inlet to an oxygen outlet of adjacent ceramic oxygen generating modules.

11. The electrochemical oxygen generating system of claim 1, further comprising two mounting brackets and at least two ceramic oxygen generating modules.

12. The electrochemical oxygen generating system of claim 11, wherein said two mounting brackets provide electrical power to said at least two ceramic oxygen generating modules in one of series and parallel heat.

13. The electrochemical oxygen generating system of claim 1, wherein said heat exchanger is a counter-flow heat exchanger.

14. The electrochemical oxygen generating system of claim 1, wherein said heat exchanger includes a manifold assembly and a plurality of mounting clips each for mounting said at least one ceramic oxygen generating module and for providing an electrical connection thereto.

15. The electrochemical oxygen generating system of claim 14, wherein said manifold assembly includes a plurality of tubes located in a manifold body, wherein said plurality of tubes provides a fresh air inlet, at least one distribution channel formed outside said plurality of tubes, and return passageway for carrying oxygen depleted air.

16. The electrochemical oxygen generating system of claim 1, wherein said heat exchanger is a counter-flow heat exchanger.

17. An electrochemical oxygen generating system capable of utilizing an air supply that contains chemical and/or biological contaminants, comprising:

an oven chamber having an air inlet from the air supply and a depleted air outlet;

at least one ceramic oxygen generating module located in said oven chamber and having an oxygen outlet;

a heater mounted in said oven chamber;

a heat exchanger positioned between said fresh air inlet and said oven chamber; and a controller for providing electrical power to said at least one ceramic oxygen generating module and for controlling said heater;

wherein oxygen gas provided to said oxygen outlet is free of said chemical and/or biological contaminants.

18. An electrochemical oxygen generating system, comprising:

an oven chamber having a fresh air inlet and a depleted air outlet;

at least one ceramic oxygen generating module located in said oven chamber and having an oxygen outlet;

a heater mounted in said oven chamber;

a heat exchanger positioned between said fresh air inlet and said oven chamber and connected to said fresh air inlet and said depleted air outlet; and a controller for providing electrical power to said at least one ceramic oxygen generating module and for controlling said heater.

19. The electrochemical oxygen generating system of claim 18, further comprising a thermocouple mounted in said oven chamber without being connected to said at least one ceramic oxygen generating module, said thermocouple sending a signal to said controller indicative of a temperature in said oven chamber.

20. The electrochemical oxygen generating system of claim 18, further comprising at least one damper connected to said heat exchanger and controlled by said controller for allowing some of the fresh air to be redirected into said oven chamber and remaining fresh air to flow upstream in said fresh air inlet.

21. The electrochemical oxygen generating system of claim 18, comprising a plurality of ceramic oxygen generating modules manifolded together in series.

22. The electrochemical oxygen generating system of claim 18, wherein said electrochemical oxygen generating system can produce oxygen at said oxygen outlet at pressures up to 2000 psi.

23. The electrochemical oxygen generating system of claim 18, wherein said heat exchanger provides a 180° path for fresh air entering said oven chamber and said depleted air has been heated in said oven chamber and is used to preheat said fresh air in said heat exchanger.

24. The electrochemical oxygen generating system of claim 18, further comprising two mounting brackets and at least two ceramic oxygen generating modules.

25. The electrochemical oxygen generating system of claim 24, wherein said two mounting brackets provide electrical power to said at least two ceramic oxygen generating modules in one of series and parallel heat.

26. The electrochemical oxygen generating system of claim 18, wherein said heat exchanger is a counter-flow heat exchanger.

27. The electrochemical oxygen generating system of claim 18, wherein said heat exchanger includes a manifold assembly and a plurality of mounting clips each for mounting said at least one ceramic oxygen generating module and for providing an electrical connection thereto.

28. The electrochemical oxygen generating system of claim 27, wherein said manifold assembly includes a plurality of tubes located in a manifold body, wherein said plurality of tubes provides a fresh air inlet, at least one distribution channel formed outside said plurality of tubes, and return passageway for carrying oxygen depleted air.

29. The electrochemical oxygen generating system of claim 18, wherein said heat exchanger is a counter-flow heat exchanger.

* * * * *

UNITED STATES PATENT AND TRADEMARK OFFICE
CERTIFICATE OF CORRECTION

PATENT NO. : 6,352,624 B1  Page 1 of 1
DATED : March 5, 2002
INVENTOR(S) : Victor P. Crome et al.

It is certified that error appears in the above-identified patent and that said Letters Patent is hereby corrected as shown below:

<u>Title page</u>,
Item [73], Assignee, please replace "Northrop Grumman Corporation, Los Angeles, CA (US)" with -- Litton Systems, Inc., Woodland Hills, California, (US). --

Signed and Sealed this

Twenty-eighth Day of October, 2003

JAMES E. ROGAN
*Director of the United States Patent and Trademark Office*